(12) United States Patent
Borovoy et al.

(10) Patent No.: US 10,277,409 B2
(45) Date of Patent: *Apr. 30, 2019

(54) AUTHENTICATING MOBILE APPLICATIONS USING POLICY FILES

(71) Applicant: International Business Machines Corporation, Armonk, NY (US)

(72) Inventors: Ishai Borovoy, Petach (IL); Iddo Levin, Tel-Aviv (IL); Haim Schneider, Ramot Meir (IL); Gal Shachor, Yokneam (IL); Artem Spector, Rishon Le-Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,123

(22) Filed: Dec. 7, 2017

(65) Prior Publication Data

US 2018/0109505 A1 Apr. 19, 2018

Related U.S. Application Data

(63) Continuation of application No. 14/817,383, filed on Aug. 4, 2015, which is a continuation of application
(Continued)

(51) Int. Cl.
*H04L 29/06* (2006.01)
*H04L 12/06* (2006.01)
(Continued)

(52) U.S. Cl.
CPC ............ *H04L 12/06* (2013.01); *G06F 21/33* (2013.01); *G06F 21/44* (2013.01); *H04L 63/06* (2013.01);
(Continued)

(58) Field of Classification Search
CPC ..... H04L 63/06; H04L 63/20; H04L 63/0807; H04L 63/0884; H04L 63/0815; G06F 21/44; G06F 21/33; H04W 12/06
See application file for complete search history.

(56) References Cited

U.S. PATENT DOCUMENTS 9,143,529 B2 9/2015 Qureshi et al.
2014/0331273 A1 11/2014 Koneru et al.
(Continued)

OTHER PUBLICATIONS

List of IBM Patent Applications Treated as Related: Dec. 7, 2017, 2 pages.
(Continued)

*Primary Examiner* — Robert B Leung
*Assistant Examiner* — Thomas Ho
(74) *Attorney, Agent, or Firm* — Cantor Colburn LLP; David Woycechowsky

(57) ABSTRACT

Examples of techniques for authenticating mobile applications are described herein. A method includes receiving, via a first server, a key pair and a policy file associated with a mobile service from a second server. Authentication of the mobile application is performed based on the key pair and the policy file. A scope token is generated with an application scope in response to authenticating the mobile application. Authentication of a client device is performed corresponding to the mobile application and a user to generate a doubly-authenticated scope token including a device scope and application authenticity scope. The doubly-authenticated scope token is sent to a security gateway for user authentication. A trebly-authenticated scope token is received with a grant token request and a grant token is sent to the mobile application. The grant token is received from the mobile application. An access token is generated and sent to the mobile application.

16 Claims, 5 Drawing Sheets

Related U.S. Application Data

No. 14/560,061, filed on Dec. 4, 2014, now Pat. No. 9,736,126.

(51) Int. Cl.
*G06F 21/44* (2013.01)
*G06F 21/33* (2013.01)

(52) U.S. Cl.
CPC ........ *H04L 63/062* (2013.01); *H04L 63/0807* (2013.01); *H04L 63/0884* (2013.01); *H04L 63/20* (2013.01); *G06F 2221/2103* (2013.01); *H04L 63/0815* (2013.01)

(56) References Cited

U.S. PATENT DOCUMENTS

2016/0234215 A1* 8/2016 Shankar ................. H04L 63/10
2016/0242143 A1  8/2016 Lotter et al.
2018/0007024 A1* 1/2018 Ahmed ............... H04L 63/0807

OTHER PUBLICATIONS

U.S. Appl. No. 14/560,061, filed Dec. 4, 2014, Entitled: Authenticating Mobile Applications Using Policy Files, First Named Inventor: Ishai Borovoy.

U.S. Appl. No. 14/817,383, filed Aug. 4, 2015, Entitled: Authenticating Mobile Applications Using Policy Files, First Named Inventor: Ishai Borovoy.

U.S. Appl. No. 15/592,395, filed May 11, 2017, Entitled: Authenticating Mobile Applications Using Policy Files, First Named Inventor: Ishai Borovoy.

\* cited by examiner

300

AUTHENTICATING MOBILE APPLICATIONS USING POLICY FILES

DOMESTIC PRIORITY

This application is a continuation of U.S. patent application Ser. No. 14/817,383 filed Aug. 4, 2015, which claims priority from U.S. patent application Ser. No. 14/560,061 filed Dec. 4, 2014, now U.S. Pat. No. 9,736,126, the entire contents of which are incorporated herein by reference.

BACKGROUND

The present techniques relate to authentication of mobile applications, and more specifically, to authenticating mobile applications using policy files.

Recent years have seen a rise in hybrid mobile applications that mix web technologies (e.g., scripting and markup languages) and native technologies (e.g., operating-system specific). Such applications often use duplicated implementations of key modules—both a native and a web-based implementation. Specifically, a typical hybrid application interacting with a backend server from both web and native interfaces usually has two different implementations of a remote invocation and communication protocol module facilitating server interactions. For example, a JavaScript implementation can enable requests from an HTML5 part of an application, and a native implementation can serve native requests. Hybrid applications present a number of issues, such as developing and maintaining duplicated code, as well as synchronization issues when executing.

A hypertext transfer protocol (HTTP) state may need to be synchronized between web modules and native modules of the application when communicating with the backend server; however, different protocol states are used between web modules and native modules (typically, HTTP state—cookies, headers, request/response parameters, etc.). In order to allow for a smooth interaction with the backend server, the HTTP state has to be shared between the web and native modules; otherwise, the backend server will be interacting in essence with two distinct clients. Consider, for example, a cookie-based login module in the backend server, where a request originating from a native remote invocation module has to complete some authentication process before being granted access, represented by a session cookie. Even after authentication is complete, a request generated from a web-based remote invocation module will have to go through the same authentication process, as the session cookie granted to the native module would be missing from the web-based requests. This can result in a degraded user experience, such as requiring the user to login twice.

SUMMARY

According to an embodiment described herein, a method can include receiving, via a first server, a key pair and a policy file associated with a mobile service from a second server, the policy file including a plurality of security objects to be authenticated, a plurality of computing devices to authenticate the security objects, and an order of authentication. The key pair and the policy file are distributed. An authentication request is received from a mobile application. Authentication of the mobile application is performed based in part on the key pair and the policy file. A scope token is generated with an application scope in response to authenticating the mobile application, the scope token including a signature based in part on the key pair. Authentication of a client device is performed corresponding to the mobile application and a user to generate a doubly-authenticated scope token including a device scope and application authenticity scope. The doubly-authenticated scope token is sent to a security gateway for user authentication. A trebly-authenticated scope token is received with a grant token request and a grant token is sent to the mobile application, the trebly authenticated scope token to include a user scope. The grant token is received from the mobile application. Generation and sending of an access token to the mobile application is performed.

According to another embodiment described herein, a computer program product for authenticating mobile applications can include computer-readable storage medium having program code embodied therewith. The computer readable storage medium is not a transitory signal per se. The program code is executable by a processor to cause the processor to receive, via a first server, a key pair and a policy file associated with a mobile service from a second server, the policy file including a plurality of security objects to be authenticated, a plurality of computing devices to authenticate the security objects, and an order of authentication. The processor can further distribute the key pair and the policy file. The processor can also further receive an authentication request from a mobile application. The processor can also further authenticate the mobile application based in part on the key pair and the policy file. The processor can also generate a scope token with an application scope in response to authenticating the mobile application, the scope token including a signature based in part on the key pair. The processor can also authenticate a client device corresponding to the mobile application and a user to generate a doubly-authenticated scope token including a device scope and application authenticity scope. The processor can also further send the doubly-authenticated scope token to a security gateway for user authentication. The processor can also receive a trebly-authenticated scope token with a grant token request and send a grant token to the mobile application, the trebly authenticated scope token to include a user scope. The processor can also further receive the grant token from the mobile application. The processor can also generate and send an access token to the mobile application.

DETAILED DESCRIPTION

Applications in modern electronic devices, such as mobile devices, currently may have multiple objects to be authenticated for security purposes. For example, objects to be authenticated for security purposes can include a mobile device, a mobile application and a user of the mobile application. Security gateways generally do not perform device authentication and application authentication but are generally used as security infrastructure for user authentication. Mobile enterprise application platforms (MEAPs) can be used to manage security across multiple mobile applications, among a variety of other features. A MEAP as used herein is a comprehensive suite of products and services including security services that enable development of mobile applications. For example, a MEAP can be used to develop a mobile application that can be deployed to a variety of mobile devices without changing the underlying business logic.

According to embodiments of the present disclosure, a MEAP server can use a key pair and policy file defining several security scopes to communicate with a security gateway to build an authentication token with several security scopes for accessing a mobile service. The token can be used by the mobile application to gain access to a service via the security gateway. Thus, embodiments of the present disclosure allow a MEAP server and a security gateway to share management of scopes of authentication for different security objects. Moreover, a security gateway can protect third party services using the tokens containing various security scopes, also referred to as authentication scopes, such as user, application and device authentication scopes.

Figure 1:
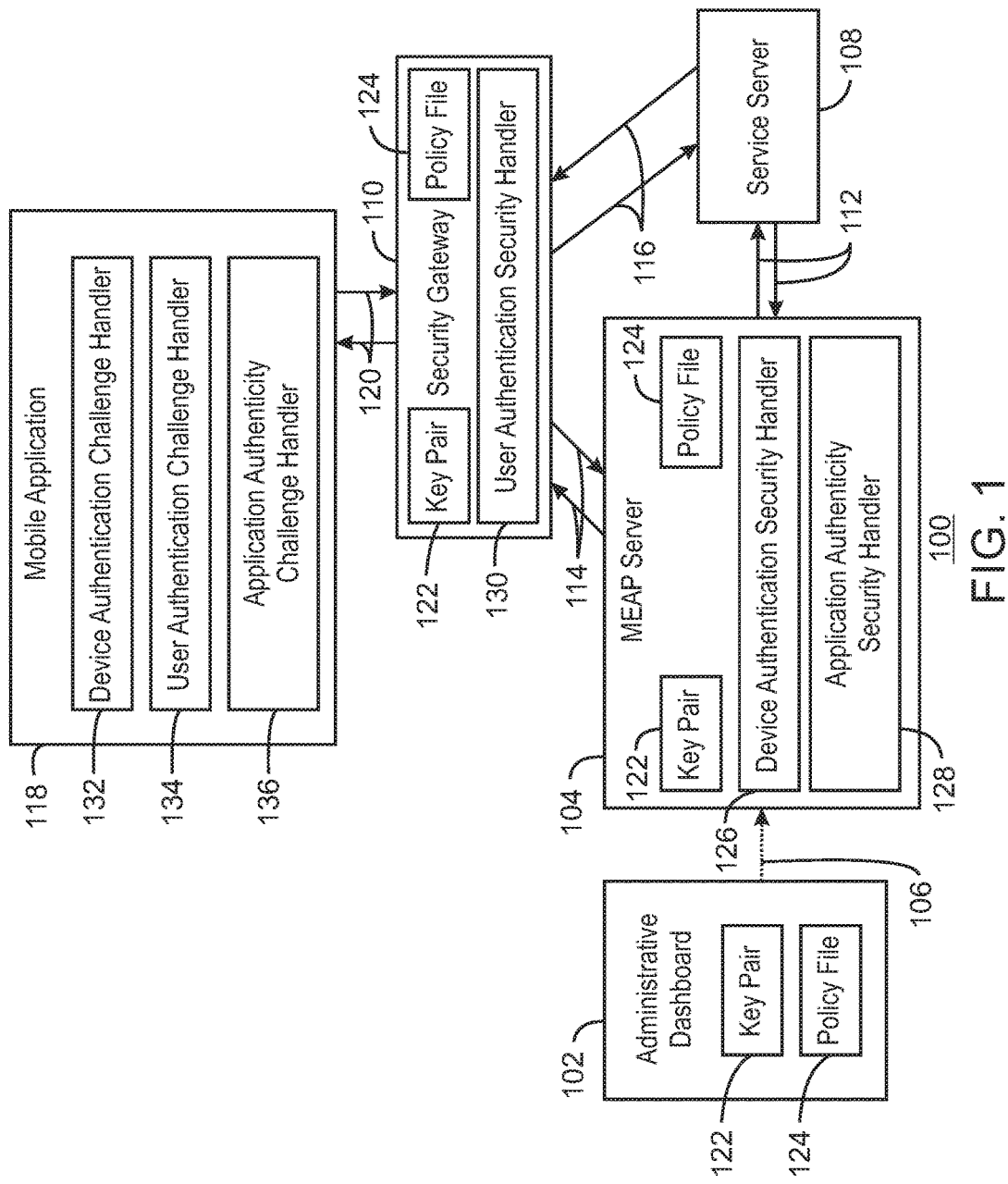
FIG. 1 is a block diagram of an example system for authenticating mobile applications.

With reference now to FIG. 1, a block diagram shows an example system for authenticating mobile applications. The example system is generally referred to by the reference number 100. FIG. 1 includes an administrative dashboard 102 communicatively coupled to a MEAP server 104 via interface 106. The MEAP server 104 is further communicatively coupled to a service server 108 and a security gateway 110, by network connections 112 and 114, respectively. The security gateway 110 is also communicatively coupled to the service server 108 by a network connection 116. The security gateway 110 is further communicatively coupled to a mobile application 118 via a network connection 120. The administrative dashboard 102, MEAP server 104, and security gateway 110 each include a key pair 122 and a policy file 124. The MEAP server 104 further includes a device authentication security handler 126 and an application authenticity security handler 128. The security gateway 110 further includes a user authentication security handler 130. The mobile application 118 includes a device authentication challenge handler 132, a user authentication challenge handler 134, and an authenticity challenge handler 136.

In the example of FIG. 1, a policy file 124 can be used to coordinate the authentication of security scopes for access to a service server 108. In some examples, an administrator can log in to the administrative dashboard 102 to manage a mobile application 118. In some examples, the administrative dashboard 102 can be an administrative interface for the MEAP server 104. The administrative dashboard 102 can receive mobile application metadata containing a key pair file 122 and a policy file 124 from the administrator. The key pair 122 can include a private key and a public key. A private key, as used herein, is an encryption key used by the MEAP server 104 or security gateway 110 to sign authentication tokens during authentication. A public key, as used herein, is a shared key used for validation of an authentication scope in a token. For example, an authentication scope can be an application authenticity scope, a device authorization scope, or a user authentication scope, that can include an expiration time and identification for each security object, among others. The key pair file 122 may correspond to a suitable authentication framework used to protect the service server 108. A policy file 124 includes a list of security objects to be authenticated, the order in which the security objects are to be authenticated, and a scope of authentication for each security object in connection with access to a particular service server 108. For example, the security objects can include a user, the mobile application 118, and a client device.

Still referring to FIG. 1, the key pair 122 and the policy file 124 can be distributed to the security gateway 110 after being received by the MEAP server 104 at administrative dashboard 102. The security gateway 110 can then receive a service request from the mobile application 118 seeking access to service server 108. In some examples, the security objects can be authenticated before the security gateway 110 grants the mobile application 118 access to service server 108. The security gateway 110 can read the policy file 124 and determine the types of authentication associated with the service server 108, an order of execution for authentication, and security devices associated with each type of authentication. For example, the policy file 124 can specify the order of authentication as application authenticity first, device authentication second, and user authentication last, or any other suitable order. The policy file 124 can also specify which security device is to authenticate each security object. For example, the policy file 124 may specify the MEAP server 104 with regards to application authenticity and device authentication and the security gateway 110 with regards to user authentication. Accordingly, the MEAP server 104 can use the device authentication security handler 126 to perform device authentication and the application authenticity security handler 128 to perform application authenticity checks. Likewise, the user authentication security handler 130 of the security gateway 110 can be used to perform user authentication according to the methods described in FIGS. 3 and 4 below.

In some embodiments, the authentication of each security object can also be coordinated with the mobile application 118 using the device authentication challenge handler 132, the user authentication challenge handler, 134, and the authenticity challenge handler 136 to receive and respond to authentication challenges from the MEAP server 104 and the security gateway 110. The authentication process produces a signed token with an authentication scope for each security object. In some examples, a security object scope within the token may have an expiration time. For example, a device authentication scope may have an expiration time of one week. In some examples, a scope may not have an expiration time. Where a scope does not have an expiration time, the scope may not expire. The MEAP server 104 can generate a doubly-authenticated scope token during a first authentication and second authentication and then send the doubly-authenticated scope token to the security gateway 110 for a subsequent third authentication. In some examples, the MEAP server 104 can send the trebly-authenticated scope token to the mobile application 118 via the security gateway 110. A trebly-authenticated scope token includes signed scopes for three security objects. For example, the security objects can be a mobile application, a mobile device, and a user. In some examples, the trebly-authenticated scope token can be used to generate a grant token that can be used to receive an access token from a server, the access token to be used to gain access to the service server 108.

In some examples, the mobile application 118 can use the access token to access the service server 108. For example, the service server 108 can include any suitable online service on a server offering protected content to the mobile application 118 such as a push subscribe service, among others. In some examples, the mobile application 118 can send the token with a service request to the security gateway 110 for validation.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional interfaces, or additional modules, etc.). For example, the MEAP server 104 can include a token end point, an authorization end point, and a validation end point. The authorization end point is a point at which requests for authorization from the mobile application are received and challenge responses are sent back to the mobile application. The token end point is a point of receipt of a grant token from the mobile application and the point at which an access token is generated to be sent to the mobile application. The validation end point is the point at which the access token is received and access to the service server 108 is granted. In some examples, these end points are located in the MEAP server 104. In some examples, one or more of these end points can be located in the security gateway 110.

Figure 2:
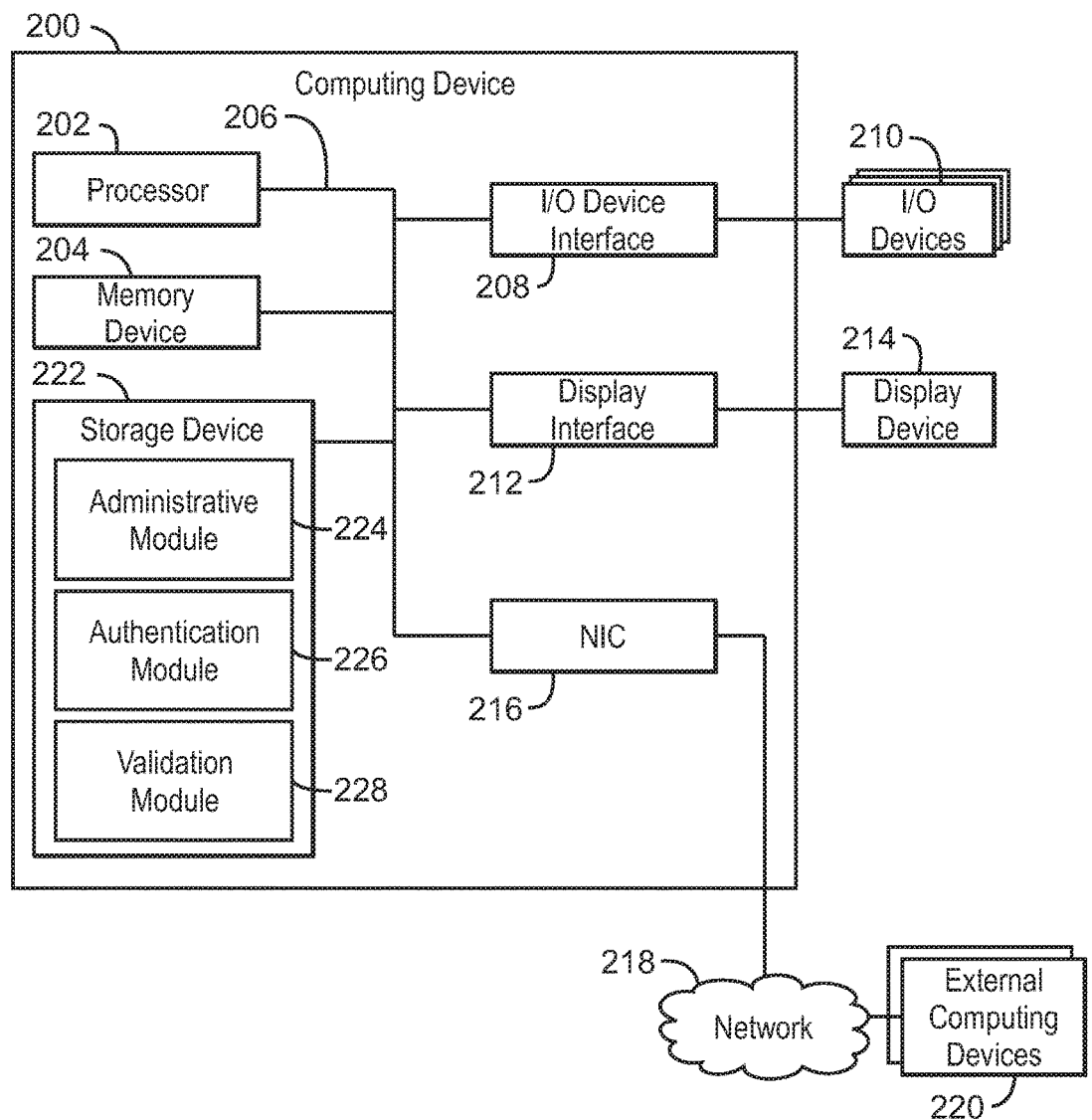
FIG. 2 is block diagram of an example computing device that can authenticate mobile applications.

FIG. 2 is block diagram of an example computing device that can authenticate mobile applications. The computing device 200 may be for example, a server, desktop computer, laptop computer, tablet computer, or smartphone. In some examples, computing device 200 may be a cloud computing node. Computing device 200 may be described in the general context of computer system executable instructions, such as program modules, being executed by a computer system. Generally, program modules may include routines, programs, objects, components, logic, data structures, and so on that perform particular tasks or implement particular abstract data types. Computing device 200 may be practiced in distributed cloud computing environments where tasks are performed by remote processing devices that are linked through a communications network. In a distributed cloud computing environment, program modules may be located in both local and remote computer system storage media including memory storage devices.

The computing device 200 may include a processor 202 that is to execute stored instructions, a memory device 204 (also referred to as memory 204) to provide temporary memory space for operations of said instructions during operation. The processor can be a single-core processor, multi-core processor, computing cluster, or any number of other configurations. The memory 204 can include random access memory (RAM), read only memory, flash memory, or any other suitable memory systems.

The processor 202 may be connected through a system interconnect 206 (e.g., PCI, PCI-Express, etc.) to an input/output (I/O) device interface 208 adapted to connect the computing device 200 to one or more I/O devices 210. The I/O devices 210 may include, for example, a keyboard and a pointing device, wherein the pointing device may include a touchpad or a touchscreen, among others. The I/O devices 210 may be built-in components of the computing device 200, or may be devices that are externally connected to the computing device 200.

The processor 202 may also be linked through the system interconnect 206 to a display interface 212 adapted to connect the computing device 200 to a display device 214. The display device 214 may include a display screen that is a built-in component of the computing device 200. The display device 214 may also include a computer monitor, television, or projector, among others, that is externally connected to the computing device 200. In addition, a network interface controller (NIC) 216 may be adapted to connect the computing device 200 through the system interconnect 206 to the network 218. In some embodiments, the NIC 216 can transmit data using any suitable interface or protocol, such as the internet small computer system interface, among others. The network 218 may be a cellular network, a radio network, a wide area network (WAN), a local area network (LAN), or the Internet, among others. External computing devices 220 may connect to the computing device 200 through the network 218. In some examples, external computing devices 220 may include an external webserver. For example, the external webserver may host a service to be accessed by a mobile application. In some examples, external computing devices 220 may include one or more cloud computing nodes. In some examples, external computing devices 220 can include a security gateway and a client device.

The processor 202 may also be linked through the system interconnect 206 to a storage device 222 that can include a hard drive, an optical drive, a USB flash drive, an array of drives, or any combinations thereof. In some examples, the storage device may include an administrative module 224, an authentication module 226, and a validation module 228. The administrative module 224 can receive metadata from an administrator containing a key pair and policy file. The administrative module 224 can send the key pair and policy to the authentication module 226 and the validation module 228.

In some examples, the authentication module 226 can authenticate one or more security objects. For example, the security objects can be a mobile application, a client device on which the mobile application is executed, and a user of the mobile application, among others. The authentication module 226 can read a policy file to determine which security objects to authenticate and the authentication scope for each security object. In some examples, the authentication module 226 generates a scope token including one or more security object scopes. In some examples, the scope token can also include a device identification and a user name. The authentication module 226 can communicate with a mobile application challenge handler on an external computing device 220, such as a mobile device, to send a challenge and receive a response from the mobile application on the device. The authentication module 226 can then sign the appropriate scope of the scope token with a private key from the key pair in response to receiving a correct response from the mobile application. The authentication module 226 can read the policy file again to determine additional security objects to authenticate using the token. The authentication module 226 can also determine whether an additional security object is to be authenticated by another external computing device 220 such as a security gateway. In some examples, the authentication module 226 can send the signed doubly-authenticated scope token to the second computing device for additional authentication of the security object. A doubly-authenticated token is a token containing two authenticated security scopes. For example, the security scopes can be application authenticity and device authentication. In some examples, the authentication module 226 can authenticate two scopes and send the doubly-authenticated token to the second computing device for authenticating a third security object. In some examples, once the appropriate scopes are signed in the token, the authentication module 226 may send the scope token to the mobile application. The mobile application can request and receive a grant token and send the grant token to a token end point to receive an access token. In some examples, the grant token may have an expiration time of ten minutes.

Still referring to FIG. 2, the validation module 228 validates a grant token received with a service request. In some examples, the validation module 228 may validate the grant token using a public key from the key pair and send a valid access token to the mobile application to use for accessing the service on the service server 108 via the access token. In some examples, the validation module 228 may determine that the grant token is invalid or expired. The validation module 228 may redirect the service request to the authentication module 226 for re-authentication. For example, one of the security object scopes in the authentication token sent with a service request may have expired. The validation module 228 can redirect the service request along with the authentication token to be re-authenticated by the authentication module 226 according to the applicable policy file.

It is to be understood that the block diagram of FIG. 2 is not intended to indicate that the computing device 200 is to include all of the components shown in FIG. 2. Rather, the computing device 200 can include fewer or additional components not illustrated in FIG. 2 (e.g., additional memory components, embedded controllers, modules, additional network interfaces, etc.). Furthermore, any of the functionalities of the administrative module 224, the authentication module 226, and the validation module 228 may be partially, or entirely, implemented in hardware and/or in the processor 202. For example, the functionality may be implemented with an application specific integrated circuit, logic implemented in an embedded controller, or in logic implemented in the processor 202, among others. In some embodiments, the functionalities of the administrative module 224, authentication module 226, and validation module 228 can be implemented with logic, wherein the logic, as referred to herein, can include any suitable hardware (e.g., a processor, among others), software (e.g., an application, among others), firmware, or any suitable combination of hardware, software, and firmware.

Figure 3:
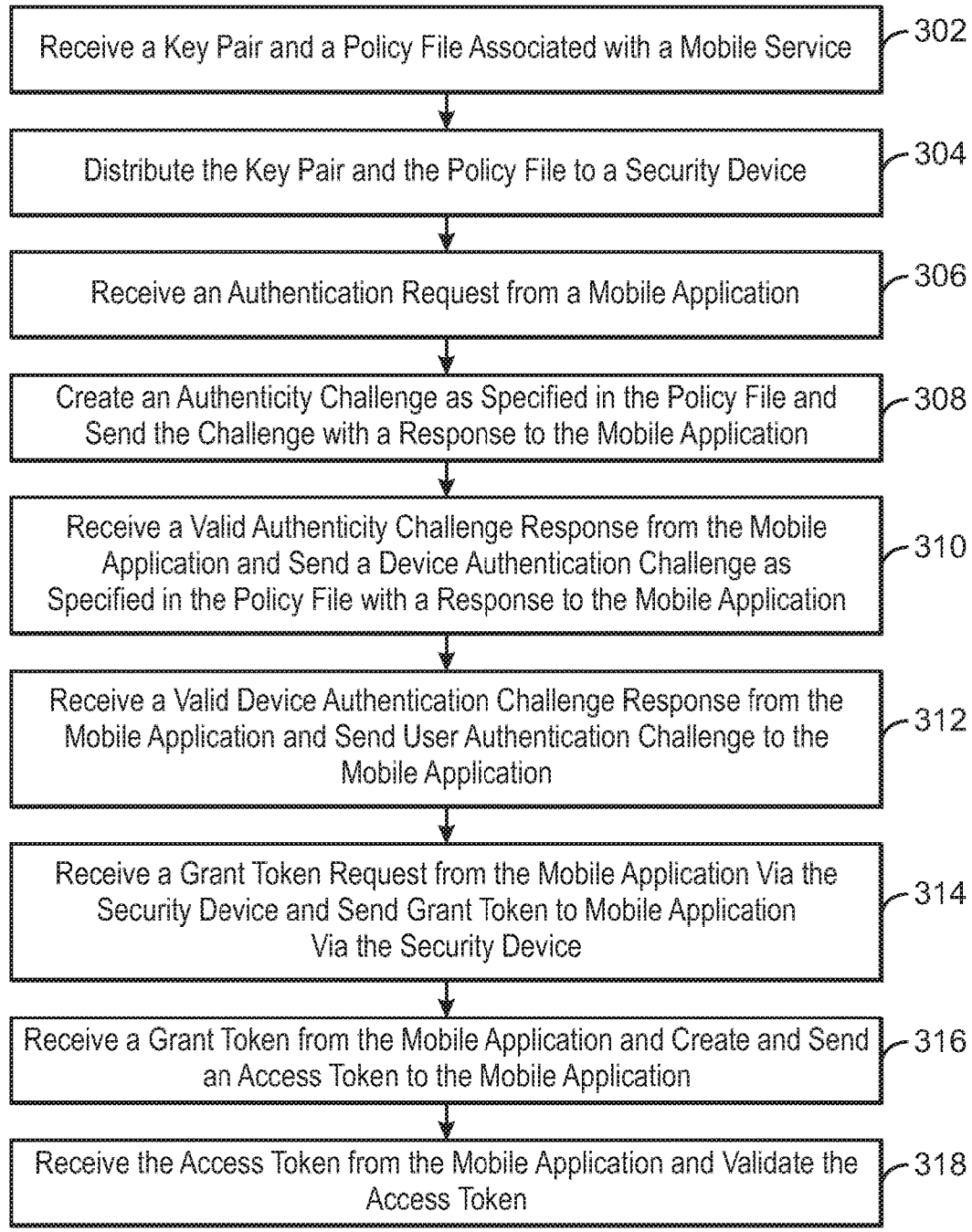
FIG. 3 is a process flow diagram of an example method that can authenticate mobile applications.

FIG. 3 is a process flow diagram of an example method that can authenticate mobile applications. The method 300 can be implemented with any suitable computing device, such as the computing device 200 of FIG. 2 and is described with reference to the system 100 of FIG. 1. In some examples, MEAP server 104 is implemented as a computing device 200.

At block 302, a first server receives a key pair 122 and a policy file 124 associated with a mobile application or service 118. For example, the mobile service may have content stored on a service server 108. In some examples, the MEAP server 104 can receive the key pair 122 and policy file 124 via an administrative dashboard 102. In some examples, the key pair 122 can include a public key and private key. For example, the public key and private key can be part of an appropriate authentication platform used to protect service server 108. The policy file 124 can include a plurality of security objects to be authenticated, a plurality of computing devices to authenticate the security objects, and an order of authentication. For example, the computing devices can be a MEAP server 104 and a security gateway 110. As discussed above, the security objects can include a device object, an application object, and a user object. In some examples, the policy file 124 can have at least one of an application authenticity scope, a device authenticity scope, and a user authenticity scope, listed in any order. In some embodiments, the policy file may indicate that the application authenticity is to be performed first via the MEAP server 104, the device authenticity is to be performed second via the security gateway 110, and the user authentication is to be performed last via the MEAP server 104.

At block 304, the MEAP server 104 distributes the key pair 122 and the policy file 124 to a security device. For example, the MEAP server 104 can send the key pair and the policy file 124 via a network connection 114 to a security device such as security gateway 110. In some examples, the security gateway 110 can use the policy file 124 to perform policies to protect services such as a REST service in the service server 108.

At block 306, the first server receives an authentication request from the mobile application 118. In some examples, the authentication request can be received at a MEAP server 104 via a security device such as security gateway 110. In some embodiments, the authentication request can include a list of one or more security objects to be authenticated according to the policy file 124. In some embodiments, the security gateway 110 can authenticate a user device as discussed in greater detail in FIG. 4 below.

At block 308, the MEAP server 104 creates an authenticity challenge as specified in the policy file 124 and sends the authenticity challenge with a response to the mobile application 118. In some examples, the authenticity challenge can include a request for application data such as a serial number. In some examples, the MEAP server 104 authenticates the mobile application 118 using the policy file 124 and the key pair 122 to generate a scope token. A scope token is a file used for authentication of security objects including fields with values including different scopes corresponding to different security objects, private key values, security object identification values, and expiration values. For example, the MEAP server 104 can create a scope token with one or more authentication scopes based on the policy file. For example, the policy file 124 may indicate that the client device is to be authenticated after the mobile application 118 in the list of security objects to be authenticated by the MEAP server 104. In some examples, the MEAP server 104 creates an application scope in the scope token after verifying that the provided identification is valid. For example, the MEAP server 104 can compare a provided serial number against a list of valid serial numbers. The MEAP server 104 can then use a private key from the key pair 122 and sign the scope token by writing the private key into a field of an application authenticity scope of the scope token.

At block 310, the MEAP server 104 receives a valid authenticity challenge response from the mobile application 118 and sends a device authentication challenge as specified in the policy file 124 with a response to the mobile application 118. In some examples, the MEAP server 104 receives an application-authenticated scope token and authenticates the client device using the key pair 122 and policy file 124. For example, the MEAP server 104 may also be responsible for device authentication and therefore contain a device authentication security handler 126. The device authentication security handler 126 can send a challenge via a security device such as security gateway 110 to the mobile application 118. For example, the device authentication challenge can include a request for device identification such as a media access control (MAC) address.

At block 312, the server receives a valid device authentication challenge response from the mobile application 118 and sends a user authentication challenge to the mobile application 118. For example, the device authentication challenge handler 132 of mobile application 118 may have responded with a challenge response including a device identification. In some examples, the MEAP server 104 can write the device identification into the device authentication scope of the scope token. The MEAP server 104 can also then sign the scope in the scope token corresponding to application authenticity with the private key by writing the private key into the device authentication scope. In some examples, a doubly-authenticated scope token, including both an application authenticity scope and a device authentication scope, can be sent to the mobile application 118 for further authentication of the user.

At block 314, the MEAP server 104 receives a grant token request from the mobile application 118 via a security device and sends a grant token to mobile application 118 via the security device. For example, the security device can be a security gateway 110. In some examples, the grant token request can be accompanied by a trebly-authenticated scope token. For example, the scope token can include three scopes having signature fields with valid private keys, including a user authentication scope. In some examples, the grant token can include the three authenticated scopes.

At block 316, the MEAP server 104 receives the grant token from the mobile application 118 and creates and sends an access token to the mobile application 118. For example, the content of an access token can be in the form: {scope: [{scopeToken:user_auth, expired:1394928000}, {scopeToken: authenticity}, {scopeToken: device_auth}], userInfo: {userName: . . . }, deviceInfo: {deviceId: . . . }}, wherein scopeToken:user_auth refers to the user authentication scope with an expiration time, scopeToken:authenticity refers to the application authenticity scope, and scopeToken: user_auth refers to the user authentication scope. The userInfo: {username . . . } and deviceInfo: [deviceId . . . } variables refer to the user name and device identification that can also be included in the access token. The mobile application 118 can then include the access token with future service requests. In some examples, the token can be signed using any appropriate digital signature. For example, the token can be signed using a JavaScript Object Notation (JSON) Web Signature (JWS) and generated in a Base64 format. For example, the access token can be included with a service request for service server 108 as received by security gateway 110. In some examples, the security gateway 110 can send an access token to a token validation end point of MEAP server 104 for validation after validating the user scope of the scope token. In some examples, the token validation end point can be a module of MEAP server 104 responsible for validating access tokens. For example, the access tokens can be validated using a public key from the key pair 122.

At block 318, the MEAP server 104 receives the access token from the mobile application and validates the access token. For example, the access token may be received at a validation end point of the MEAP server 104 that may be communicatively connected 112 with service server 108. In some examples, the access token can be validated using a public key corresponding to a private key used to create the access token.

The process flow diagram of FIG. 3 is not intended to indicate that the operations of the method 300 are to be executed in any particular order, or that all of the operations of the method 300 are to be included in every case. For example, block 310 can be executed before block 308. Additionally, the method 300 can include any suitable number of additional operations.

Figure 4:
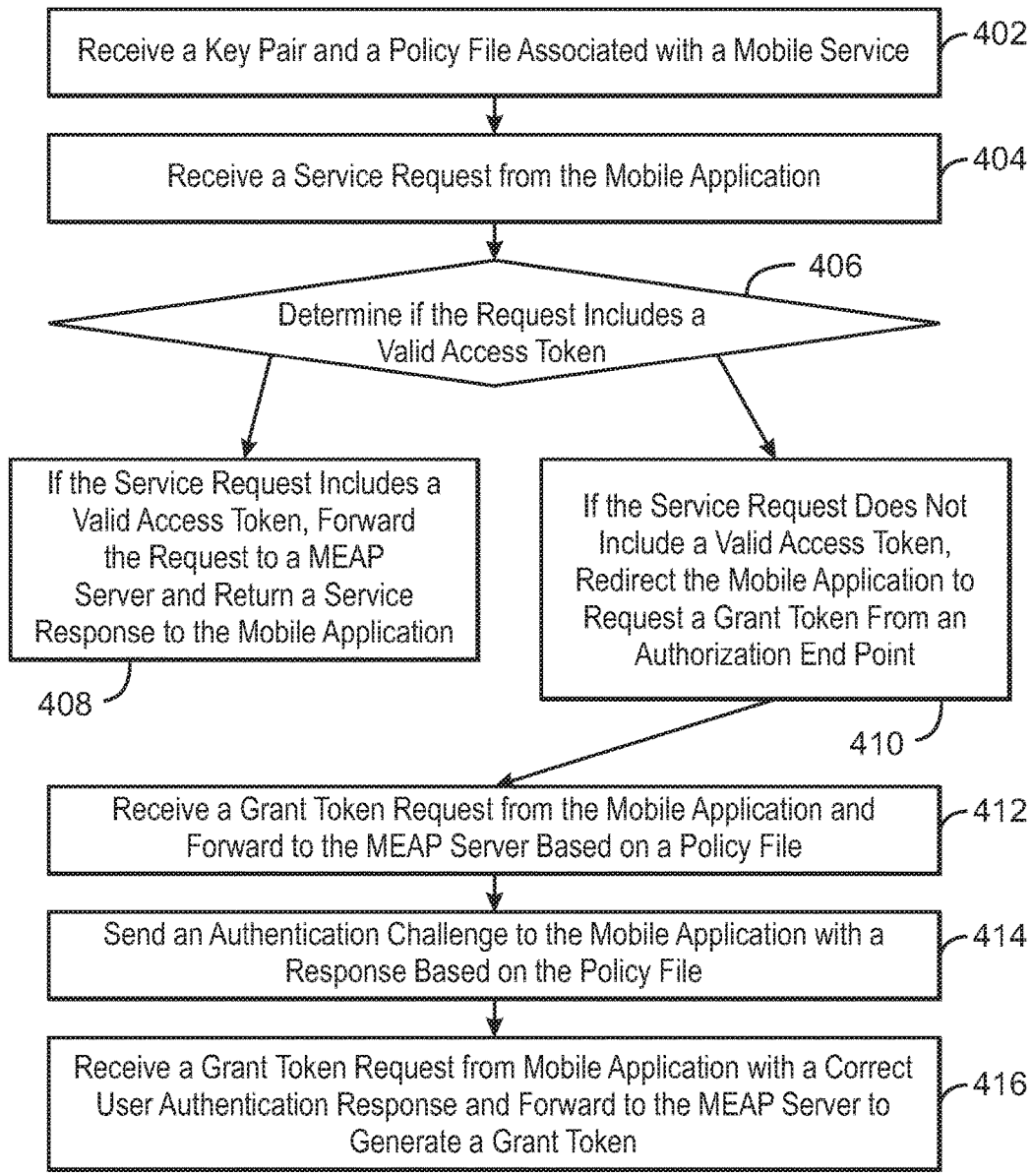
FIG. 4 is a process flow diagram of an example method that can authenticate a security object of a mobile application.

FIG. 4 is a process flow diagram of an example method that can authenticate a security object of a mobile application 118. The method 400 can be implemented with any suitable computing device, such as the computing device 200 of FIG. 2 and is described with reference to the system 100 of FIG. 1. For example, the methods described below can be implemented by security gateway 110 of FIG. 1.

At block 402, a security device receives a key pair 122 and a policy file 124 associated with a mobile application or service 118. For example, the security device can be a security gateway 110 and the mobile service may have content such as REST services stored on a service server 108. The policy file 124 can include a plurality of security objects to be authenticated, a plurality of computing devices to authenticate the security objects, and an order of authentication. For example, one of the computing devices can be the security gateway 110.

At block 404, the security device receives a service request from the mobile application 118. In some examples, the security device can be a security gateway 110 that receives a service request via a network connection 120. For example, the requested service can be a REST service from service server 108.

At block 406, the security device determines if the request includes a valid access token. For example, the request may or may not include a valid access token to access the requested service. In some examples, the security gateway 110 sends the request for validation at a validation end point of an MEAP server 104. In some examples, the validation end point may be on the security gateway 110. In some examples, a validation end point can determine whether an access token is valid by comparing one or more expiration timestamps in the access token to a system time and by using the public key from the key pair 122.

At block 408, if the service request includes a valid access token, the security device forwards the request to the MEAP server 104 and returns a service response to the mobile application 118. A valid access token indicates that the mobile application 118 has been previously authenticated to retrieve content from a service within the defined scopes of the access token. For example, the service response can include content from service server 108.

At block 410, if the service request does not include a valid access token, the security device redirects the mobile application 118 to request a grant token from an authorization end point. For example, the authorization end point can be on MEAP server 104. An authorization end point is a module that is capable of receiving and validating scope tokens and generating a grant token. In some examples, the security gateway 110 can redirect the mobile application 118 to request authorization of one or more security objects.

At block 412, the security device receives a grant token request from the mobile application 118 and forwards the grant token request to the MEAP server 104 based on the policy file 124. In some examples, the security gateway 110 can forward the grant token request to the MEAP server 104 after reading the policy file 124 and determining a first authentication in the ordered list of security measures is to be handled by the MEAP server 104. In some examples, the security gateway 110 may be specified as being responsible for handling a first authentication. For example, the first authentication can be a device authentication, an application authentication or a user authentication.

At block 414, the security device sends an authentication challenge to the mobile application 118 with a response based on policy file 124. For example, the authentication challenge can be a user authentication challenge. In some examples, the security gateway 110 can be listed in the policy file 124 as the particular computing device to perform the user authentication security check. For example, a third authentication security object in the policy file 124 can be user authentication. The user authentication challenge handler 134 of mobile application 118 can respond with a challenge response via network connection 120. In some examples, a valid challenge response can include a user name and password. The security gateway 110 can sign the corresponding user authentication scope in the scope token using a private key from the key pair 122. In some examples, the user authentication scope can include an expiration time. For example, the expiration time can be a day or a week from the time that the security object is authenticated. In some examples, the scope token can include a user name and a device identification. In some examples, the security gateway 110 can send a security challenge to a handler 132, 134, 136 for the specific security challenge in the mobile application 118. For example, a device authentication security challenge can be sent to a device authentication challenge handler 132 of the mobile application. The device authentication challenge handler 132 may then respond with a valid security response. For example, the device authentication challenge handler 132 of a mobile application 118 may respond with a device identification.

At block 416, the security device receives a grant token request from the mobile application 118 with a correct user authentication response and forwards the request to the MEAP server 104 to generate a grant token. In some examples, the grant token can then be used to obtain an access token from a token end point at an MEAP server 104 and the access token can be used by the mobile application 118 to access content from the service server 108. For example, the authentication and generation of a grant token may be defined in a specification such as OAuth 2.0, among others.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, method 400 can also include receiving a service request with an access token at the security device and re-authenticating a security object if the corresponding scope of the access token is invalid or expired.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
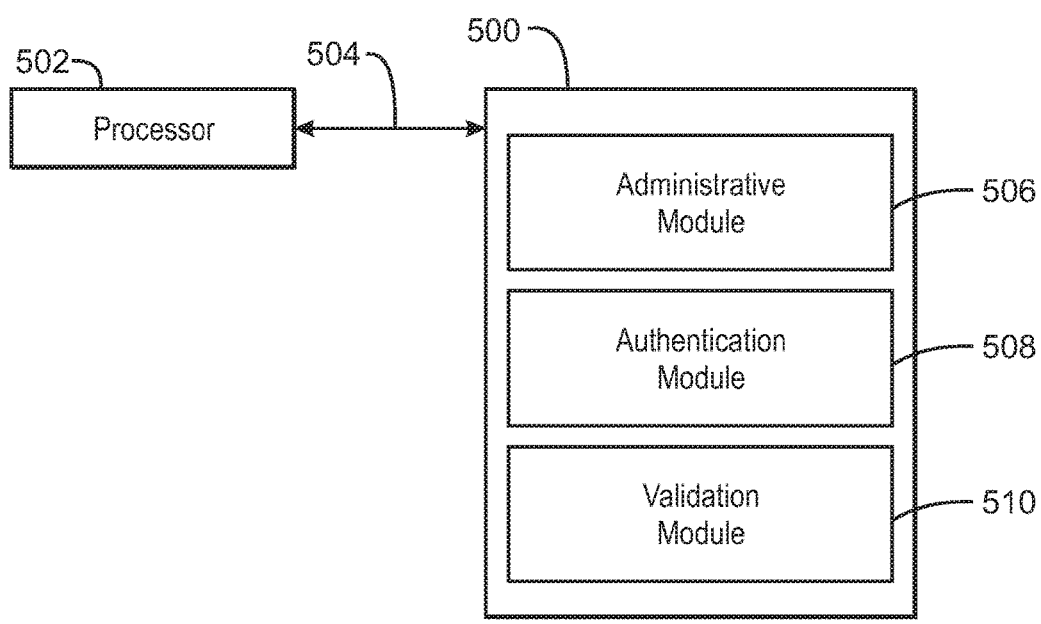
FIG. 5 is an example tangible, non-transitory computer-readable medium that can authenticate mobile applications.

Referring now to FIG. 5, a block diagram is depicted of an example tangible, non-transitory computer-readable medium 500 that can authenticate mobile applications. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, an administrative module 506 includes code to receive a key pair and a policy file with authentication scopes and priorities for a plurality of security objects for a mobile service. An authentication module 508 includes code to receive a service request from a mobile application. For example, the service request can be a request for one or more objects from a mobile service. The validation module 510 includes code to determine if the service request includes a valid access token. The authentication module 508 includes code to redirect the mobile application to ask for a grant token from an authorization end point on a server if the request is does not include a valid access token. The authentication module 508 includes code to receive an authorization request from the mobile application and forward to the server based on a policy file, the policy file including a plurality of security objects to be authenticated, a plurality of machines to authenticate the security objects, and an order of authentication.

In some examples, the authentication module 508 includes code to send an authentication challenge to the mobile application with a response based on the policy file. For example, the authentication challenge can include a user authentication challenge. In some examples, the authentication module 508 includes code to receive a second request from the mobile application with a correct authentication response and forward the second request to a server to generate a grant token. In some examples, the authentication module 508 includes code to forward the service request to the server and return a service response to the mobile application if the service request includes a valid access token. In some examples, the access token includes a user authentication scope, a device authentication scope, and an application authenticity scope, a device identification number, and a user identification. It is to be understood that any number of additional software components not shown in FIG. 5 may be included within the tangible, non-transitory, computer-readable medium 500, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 5 may be included within the tangible, non-transitory, computer-readable medium 500, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, via a first server, a key pair and a policy file associated with a mobile service from a second server, the policy file comprising a list of:
a plurality of security objects to be authenticated,
a plurality of computing devices to authenticate the security objects, and
an order of authentication;
distributing the key pair and the policy file;
receiving an authentication request from a mobile application;
authenticating the mobile application based in part on the key pair and the policy file;
generating a scope token with an application scope in response to authenticating the mobile application, the scope token comprising a signature based in part on the key pair;
authenticating a client device corresponding to the mobile application and a user to generate a doubly-authenticated scope token comprising a device scope and application authenticity scope;
sending the doubly-authenticated scope token to a security gateway for user authentication;
receiving a trebly-authenticated scope token with a grant token request and sending a grant token to the mobile application, the trebly authenticated scope token to include a user scope;
receiving the grant token from the mobile application; and
generating and sending an access token to the mobile application.

2. The method of claim 1, wherein a service server is accessible by the mobile application using the access token.

3. The method of claim 1, wherein the key pair comprises a private key and a public key.

4. The method of claim 3, wherein the policy file comprises instructions defining types of security checks associated with a service, an order in which the authentications are to be executed, and a device responsible for each authentication.

5. The method of claim 1, wherein the application scope, the user scope, and the device scope comprise an expiration time.

6. The method of claim 1, further comprising a mobile enterprise application platform (MEAP) executable by the processor to validate the access token.

7. The method of claim 1, wherein the scope token further comprises a device identification and a user name.

8. A computer program product for authenticating mobile applications, the computer program product comprising a computer-readable storage medium having program code embodied therewith, wherein the computer readable storage medium is not a transitory signal per se, the program code executable by a processor to cause the processor to:
  receive, via a first server, a key pair and a policy file associated with a mobile service from a second server, the policy file comprising a list of:
    a plurality of security objects to be authenticated,
    a plurality of computing devices to authenticate the security objects, and
    an order of authentication;
  distribute the key pair and the policy file;
  receive an authentication request from a mobile application;
  authenticate the mobile application based in part on the key pair and the policy file;
  generate a scope token with an application scope in response to authenticating the mobile application, the scope token comprising a signature based in part on the key pair;
  authenticate a client device corresponding to the mobile application and a user to generate a doubly-authenticated scope token comprising a device scope and application authenticity scope;
  send the doubly-authenticated scope token to a security gateway for user authentication;
  receive a trebly-authenticated scope token with a grant token request and send a grant token to the mobile application, the trebly authenticated scope token to include a user scope;
  receive the grant token from the mobile application; and
  generate and send an access token to the mobile application.

9. The computer program product of claim 8, wherein a service server is accessible by the mobile application using the access token.

10. The computer program product of claim 8, wherein the key pair comprises a private key and a public key.

11. The computer program product of claim 10, wherein the policy file comprises instructions defining types of security checks associated with a service, an order in which the authentications are to be executed, and a device responsible for each authentication.

12. The computer program product of claim 8, wherein the application scope, the user scope, and the device scope comprise an expiration time.

13. The computer program product of claim 8, wherein a mobile enterprise application platform (MEAP) is executable by the processor to validate the access token.

14. The computer program product of claim 8, wherein the scope token further comprises a device identification and a user name.

15. The computer program product of claim 8, wherein the program code executable by the processor further causes the processor to provide access to a service server for the mobile application using the access token.

16. The method of claim 1, further comprising:
  providing access to a service server for the mobile application using the access token.

* * * * *